Figure 1:
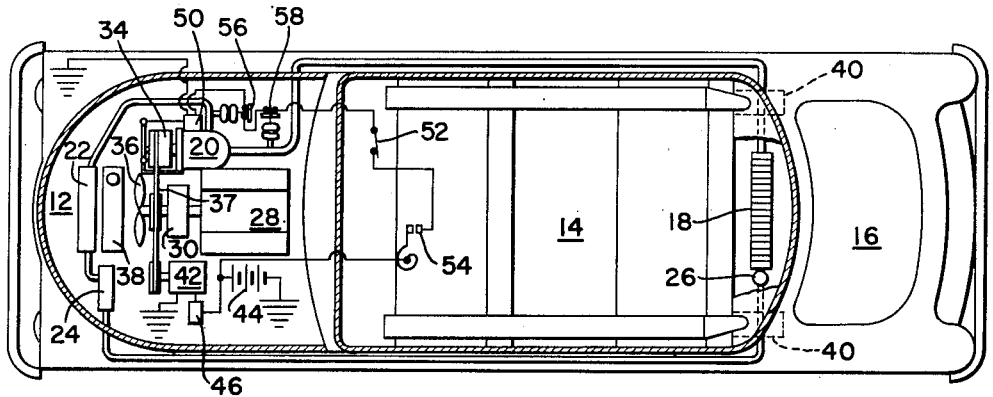

Jan. 29, 1957     J. W. JACOBS     2,779,163

VEHICLE REFRIGERATING APPARATUS

Filed Aug. 21, 1953

INVENTOR.
James W. Jacobs
BY R. R. Candor
His Attorney

United States Patent Office 2,779,163
Patented Jan. 29, 1957

2,779,163
VEHICLE REFRIGERATING APPARATUS

James W. Jacobs, Dayton, Ohio, assignor to General Motors Corporation, Detroit, Mich., a corporation of Delaware Application August 21, 1953, Serial No. 375,649

2 Claims. (Cl. 62—4)

This invention relates to refrigerating apparatus and more particularly to an automobile air conditioning system.

One of the big problems in designing air conditioning equipment for a passenger automobile or the like is to provide air conditioning equipment which has ample compressor and condenser capacity to supply the maximum refrigeration demand at the slowest engine speeds and yet be capable of operating efficiently and satisfactorily at the highest engine speeds. Most, if not all, present day automobile air conditioning systems have compressors and condenser cooling fans which are directly operated by the car engine and which are designed to supply the maximum refrigeration demand at the slowest engine speeds with the result that at the highest engine speeds the compressor and the condenser fan operate at highly excessive and inefficient speeds.

It is an object of this invention to provide an automobile air conditioning system in which the mechanism used in transmitting power from the engine to the compressor and the condenser cooling fan is of the variable speed ratio type which not only varies the speed of the compressor but also varies the speed of the condenser cooling fan as well as the speed of the generator which supplies power for operating the evaporator blower motor or motors.

Another object of this invention is to provide an automobile air conditioning system which not only provides for speed regulation of the compressor but also provides means for declutching the compressor when no refrigeration is required.

Still another object of this invention is to provide simple and inexpensive means for protecting the compressor in the event that the refrigerant pressures in the system should become abnormally high or abnormally low.

Further objects and advantages of the present invention will be apparent from the following description, reference being had to the accompanying drawings wherein a preferred embodiment of the present invention is clearly shown.

Figure 2:
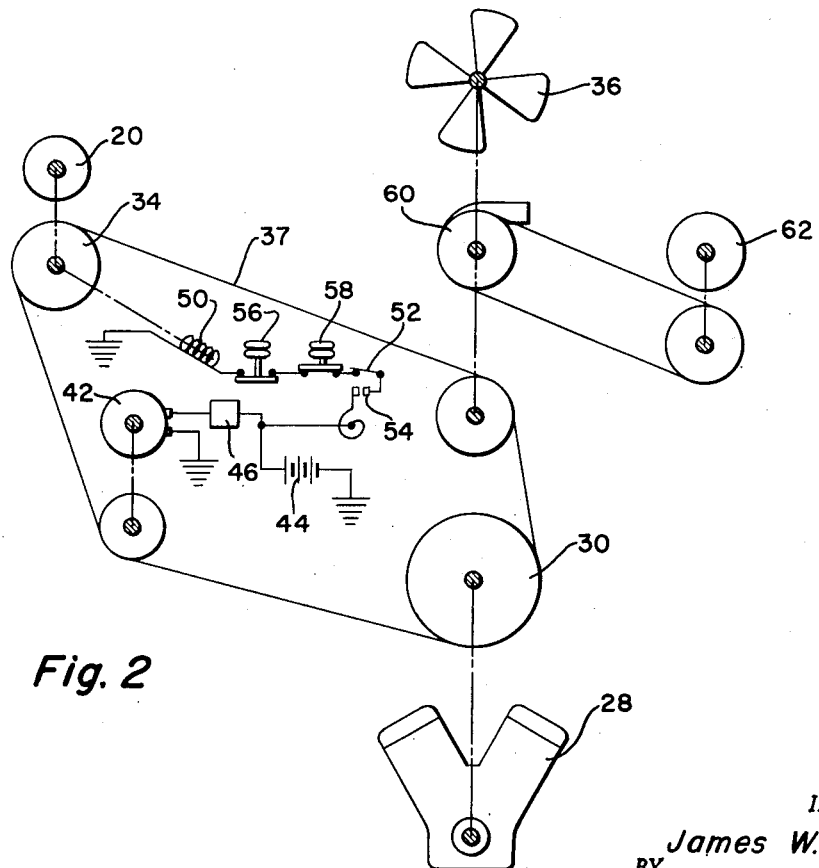

In the drawing:

Figure 1 is a plan view with parts broken away showing somewhat diagrammatically the invention as applied to a conventional passenger automobile; and Figure 2 is a schematic diagram showing the power transmitting mechanism and the electrical controls.

Referring now to the drawing wherein a preferred embodiment of the invention has been shown, there is shown a conventional passenger automobile having an engine compartment 12, a passenger compartment 14 and a luggage compartment 16. The air conditioning equipment for the car includes a refrigerating system having an evaporator 18 which, for purposes of illustration, has been shown located in the luggage compartment of the car whereas the evaporator could be located in any other suitable location such as under one of the seats or behind the instrument panel.

The evaporator 18 is connected in refrigerant flow relationship with a compressor 20, a condenser 22 and a receiver 24. Flow of refrigerant to the evaporator 18 is controlled by the usual thermostatic expansion valve 26 located at the inlet to the evaporator 18 in accordance with standard practice. The compressor 20 is adapted to be driven by the main car engine 28 through a variable speed ratio drive device 30, belt means 37 and a clutch 34.

The variable speed ratio drive means 30 may be of any of several well-known types of drives which serve to drive the compressor at a substantially constant speed irrespective of wide variations in the car engine speed and may be of the type shown in the patent to Perrine, 2,151,987. It is recognized that others have provided variable speed ratio drives between an engine and a compressor but this alone does not solve the problem since it is also necessary to maintain a proper balance between engine speed, condenser capacity and refrigeration requirements.

In the arrangement shown, a fan 36 has been provided for circulating condenser cooling air over the condenser 22 as well as over the engine cooling radiator 38. This condenser cooling fan 36 is adapted to be driven by the output shaft of the variable speed ratio drive device 30 with the result that even though the car engine 12 may be operating at idling speed, the condenser fan will be operated at a high enough speed to provide adequate condenser capacity and if the speed of the car engine 12 be increased to or near maximum speed, the condenser cooling fan 36 as well as the compressor will still be operated at substantially its former speed.

In the arrangement shown a pair of blowers 40 are provided for circulating air to be conditioned in thermal exchange relationship with the evaporator 18 and for directing the conditioned air into the passenger compartment of the car. The motors for operating these blowers require an appreciable amount of current but the amount of current required bears no relationship to the car speed and therefore the generator 42 which supplies power for operating the evaporator blowers 40 and charging the usual car storage battery 44 is also arranged to be driven by the car engine through the variable speed ratio device 30. The usual voltage regulator and reverse current relay mechanism 46 has been provided between the generator and the battery 44 as shown.

Since there are times when no refrigeration will be required, the clutch 34 which is provided between the variable speed ratio device 30 and the compressor 20 is adapted to be declutched at such times when no refrigeration is required. The clutch 34 is of the type shown in copending application S. N. 376,604, filed August 26, 1953 and includes a solenoid 50 which is arranged in an electrical circuit as diagrammatically illustrated in the drawing. The arrangement is such that the clutch is normally disengaged when the solenoid is de-energized and is engaged in response to energization of the solenoid. The solenoid is arranged in series with a plurality of switches, 52, 54, 56 and 58 as shown in the drawing. The opening of any one of these switches would cause de-energization of the solenoid which would then serve to declutch the refrigerant compressor. A manual switch 52 is provided in the circuit as shown and serves to make it possible to manually start and stop the air conditioning equipment from within the passenger compartment. When the switch 52 is closed, the operation of the refrigerating system will be automatically controlled by means of the thermostatic switch 54 which is adapted to respond to refrigeration requirements. For purposes of illustration the thermostat has been shown located in the passenger compartment of the car whereas it could be located in the return air duct or in any other suitable location where it would respond to refrigeration requirements. A high refrigerant pressure safety switch 56 and a low refrigerant pressure safety switch 58 have been provided as shown for causing declutching of the compressor in the event that an abnormally high head pressure or an abnormally low suction pressure should occur. The switches 56 and 58 would normally remain closed at all times and would only operate in an emergency such as in the event that the refrigerant charge leaked out, the refrigerant lines became clogged, or the like.

As shown in Figure 2 of the drawing, the accessories including the water pump 60 and power steering pump 62 are all driven by the variable speed ratio power transmitting means 30 as these too operate better when driven more nearly at constant speed. By using a belt drive between the power transmitting means and the various accessories it is possible to obtain the desired speed differentiation between the various accessories in a very convenient manner.

While the embodiment of the present invention as herein disclosed constitutes a preferred form, it is to be understood that other forms might be adopted.

What is claimed is as follows:

1. In combination with a passenger automobile having an engine compartment and a passenger compartment, an engine within said engine compartment for propelling said automobile, said engine including a heat dissipating radiator, an evaporator, means for crculating air to be conditioned in thermal exchange relationship with said evaporator and for discharging said air into said passenger compartment, a compressor, a condenser adjacent said radiator, refrigerant flow connections between said compressor, condenser and evaporator, fan means for circulating air in thermal exchange relationship with said condenser and said radiator variable speed ratio power transmitting means for transmitting power from said engine to said compressor and to said fan means, said power transmitting means including a clutch connected with said compressor, a solenoid for operating said clutch, a source of electrical energy, circuit means connecting said solenoid to said source of electrical energy, said circuit means including a manually operable switch and a switch responsive to a predetermined pressure within said refrigerant flow connections.

2. In combination with a passenger automobile having an engine compartment and a passenger compartment, an engine within said engine compartment for propelling said automobile, said engine including a heat dissipating radiator, an evaporator, means for circulating air to be conditioned in thermal exchange relationship with said evaporator and for discharging said air into said passenger compartment, a compressor, a condenser adjacent said radiator, refrigerant flow connections between said compressor, condenser and evaporator, fan means for circulating air in thermal exchange relationship with said condenser and said radiator, power transmitting means between said engine and said compressor and said fan means, said power transmitting means including variable speed drive means for varying the speed ratio between said compressor and fan means and said engine whereby the speed of said fan means relative to the speed of said engine is greater at low engine speeds than at high engine speeds, said fan means being driven by said means for varying said speed ratio, a clutch connected between said variable speed drive means and said compressor, and means for operating said clutch so as to disengage said compressor from said variable speed drive means.

References Cited in the file of this patent
UNITED STATES PATENTS

| | | |
|---|---|---|
| 2,104,387 | Hull | Jan. 4, 1938 |
| 2,104,696 | Hanson | Jan. 4, 1938 |
| 2,151,987 | Perrine et al. | Mar. 28, 1939 |
| 2,173,661 | Perrine | Sept. 19, 1939 |
| 2,187,397 | Goggins | Jan. 16, 1940 |
| 2,264,821 | Zukowski | Dec. 21, 1941 |
| 2,344,864 | Griswold | Mar. 21, 1944 |
| 2,449,888 | Edwards | Sept. 21, 1948 |
| 2,495,350 | Smith | Jan. 24, 1950 |
| 2,561,876 | Leonard | July 24, 1951 |
| 2,614,396 | Ratermann | Oct. 21, 1952 |
| 2,636,356 | Ryan | Apr. 28, 1953 |
| 2,660,865 | Durant | Dec. 1, 1953 |
| 2,722,106 | Henny | Nov. 1, 1955 |